United States Patent [19]

Kobori et al.

[11] Patent Number: 4,734,759
[45] Date of Patent: Mar. 29, 1988

[54] A VIDEO PRINTER HAVING COLOR SIGNAL INTERPOLATION CIRCUIT

[75] Inventors: Yasunori Kobori, Yokohama; Toshihiko Gotoh, Tokyo; Kentaro Hanma, Yokohama, all of Japan

[73] Assignee: Hitachi, Ltd., Tokyo, Japan

[21] Appl. No.: 859,808

[22] Filed: May 5, 1986

[30] Foreign Application Priority Data

May 9, 1985 [JP]   Japan .................................. 60-96601

[51] Int. Cl.$^4$ .............................................. H04N 1/46
[52] U.S. Cl. ........................................ 358/75; 358/78; 358/44
[58] Field of Search ...................... 358/75, 78, 37, 12, 358/13, 15, 44, 48, 50

[56] References Cited

U.S. PATENT DOCUMENTS 4,176,373  11/1979  Dillon et al. .......................... 358/37
4,490,738  12/1984  Asaida ................................... 358/50
4,605,956  8/1986   Cok ....................................... 358/44
4,642,678  2/1987   Cok ....................................... 358/44

FOREIGN PATENT DOCUMENTS 111192  7/1982  Japan ..................................... 358/48

Primary Examiner—James J. Groody
Assistant Examiner—Robert M. Bauer
Attorney, Agent, or Firm—Antonelli, Terry & Wands

[57] ABSTRACT

A video printer having color signal interpolation circuit including a first memory which stores a color signal requiring the largest amount of information among signal of three primary colors in a video signal, a second memory which stores both of the other two color signals sampled alternately, and a data interpolation circuit with a signal edge detecting part and signal level detecting part and which reproduces the other two color signals on the basis of the signals stored in the second memory by interpolation. Color signals delivered from the first memory and the data interpolation circuit are successively sent to the printer so as to be printed.

19 Claims, 21 Drawing Figures

FIG. 2a  FIG. 2b  FIG. 2c
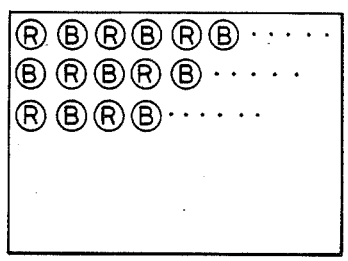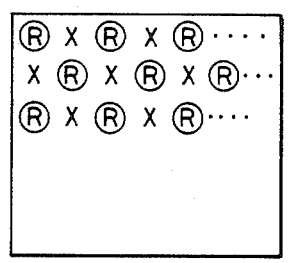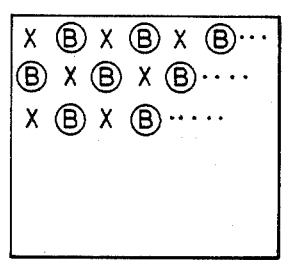
FIG. 3
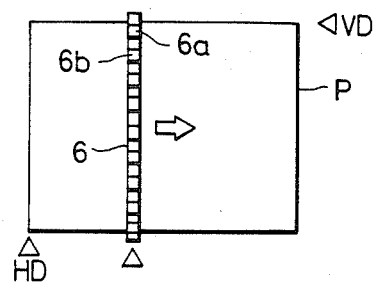

FIG. 6a

| M3 | M2 | M1 | MB | MA | OUT PUT OF SWITCH 14 | NUMBER OF OUT PUT DATA |
|---|---|---|---|---|---|---|
| $D_{2n}$ | $D_{2n-1}$ | $D_{2n-2}$ | $D'_{2n-1}$ | $D'_{2n-2}$ | MA | $2n-2$ |
| $D_{2n+1}$ | $D_{2n}$ | $D_{2n-1}$ | $D'_{2n}$ | $D'_{2n-1}$ | M1 | $2n-1$ |
| $D_{2n+2}$ | $D_{2n+1}$ | $D_{2n}$ | $D'_{2n+1}$ | $D'_{2n}$ | MA | $2n$ |
| $D_{2n+3}$ | $D_{2n+2}$ | $D_{2n+1}$ | $D'_{2n+2}$ | $D'_{2n+1}$ | M1 | $2n+1$ |
| ⋮ | ⋮ | ⋮ | ⋮ | ⋮ | ⋮ | ⋮ |

FIG. 6b

| M3 | M2 | M1 | MB | MA | OUT PUT OF SWITCH 14 | NUMBER OF OUT PUT DATA |
|---|---|---|---|---|---|---|
| $D_{2m}$ | $D_{2m-1}$ | $D_{2m-2}$ | $D'_{2m-1}$ | $D'_{2m-2}$ | M1 | $2m-2$ |
| $D_{2m+1}$ | $D_{2m}$ | $D_{2m-1}$ | $D'_{2m}$ | $D'_{2m-1}$ | MA | $2m-1$ |
| $D_{2m+2}$ | $D_{2m+1}$ | $D_{2m}$ | $D'_{2m+1}$ | $D'_{2m}$ | M1 | $2m$ |
| $D_{2m+3}$ | $D_{2m+2}$ | $D_{2m+1}$ | $D'_{2m+2}$ | $D'_{2m+1}$ | MA | $2m+1$ |
| ⋮ | ⋮ | ⋮ | ⋮ | ⋮ | ⋮ | ⋮ |

FIG. 7a

| M3 | M2 | M1 | MB | MA | OUT PUT OF SWITCH 14 | NUMBER OF OUT PUT DATA |
|---|---|---|---|---|---|---|
| ⋮ | ⋮ | ⋮ | ⋮ | ⋮ | ⋮ | |
| | | | | | | 508 |
| $D_{511}$ | $D_{510}$ | $D_{509}$ | $D'_{510}$ | $D'_{509}$ | $M_1$ | 509 |
| ($D_{511}$) | $D_{511}$ | $D_{510}$ | $D'_{511}$ | $D'_{510}$ | $M_A$ | 510 |
| ($D_{511}$) | ($D_{511}$) | ($D_{511}$) | ($D_{511}$) | $D'_{511}$ | $M_1$ | 511 |
| ($D_{511}$) | ($D_{511}$) | ($D_{511}$) | ($D_{511}$) | ($D_{511}$) | $M_A$ | 512 |

FIG. 7b

| M3 | M2 | M1 | MB | MA | OUT PUT OF SWITCH 14 | NUMBER OF OUT PUT DATA |
|---|---|---|---|---|---|---|
| $D_1$ | — | — | — | — | — | — |
| $D_2$ | $D_1$ | — | — | — | — | — |
| $D_3$ | $D_2$ | $D_1$ | $D'_2$ | ($D_2$) | $M_A$ | 1 |
| $D_4$ | $D_3$ | $D_2$ | $D'_3$ | $D'_2$ | $M_1$ | 2 |
| $D_5$ | $D_4$ | $D_3$ | $D'_4$ | $D'_3$ | $M_A$ | 3 |
| $D_6$ | $D_5$ | $D_4$ | $D'_5$ | $D'_4$ | $M_1$ | 4 |
| ⋮ | ⋮ | ⋮ | ⋮ | ⋮ | ⋮ | ⋮ |

| DATA NO. \ LINE | L2ℓ-1 | L2ℓ | L2ℓ+1 | OUT PUT OF SWITCH 14 |
|---|---|---|---|---|
| ⋮ | ⋮ | ⋮ | ⋮ | ⋮ |
| 2n-2 | Ⓧ | $D_{2ℓ,2n-2}$ | Ⓧ | $M_A$ |
| 2n-1 | $D_{2ℓ-1,2n-1}$ | Ⓧ | $D_{2ℓ+1,2n-1}$ | $M_B$ |
| 2n | Ⓧ | $D_{2ℓ,2n}$ | Ⓧ | $M_A$ |
| 2n+1 | $D_{2ℓ-1,2n-1}$ | Ⓧ | $D_{2ℓ+1,2n+1}$ | $M_B$ |
| 2n+2 | Ⓧ | $D_{2ℓ,2n+2}$ | Ⓧ | $M_A$ |
| ⋮ | ⋮ | ⋮ | ⋮ | ⋮ |

FIG. 13
| DATA NO. \ LINE | $L_{\ell-1}$ | $L_\ell$ | $L_{\ell+1}$ |
|---|---|---|---|
| n−1 | (X) | $R_{\ell,n-1}$ | (X) |
| n | $R_{\ell-1,n}$ | ($X_{\ell,n}$) | $R_{\ell+1,n}$ |
| n+1 | (X) | $R_{\ell,n+1}$ | (X) |
FIG. 14
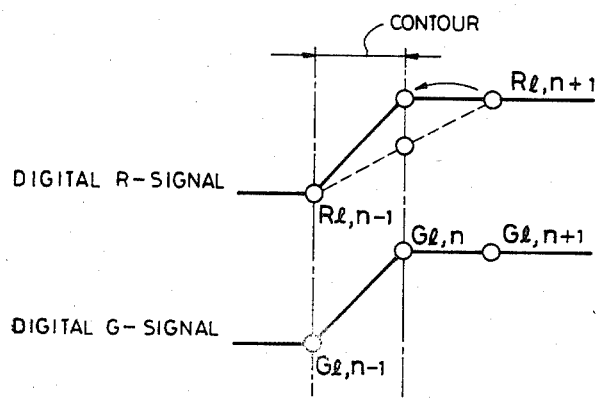
FIG. 15
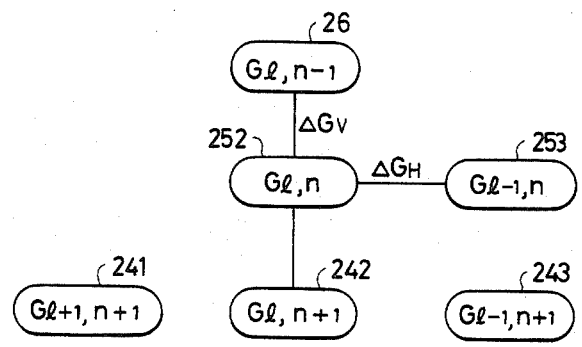

A VIDEO PRINTER HAVING COLOR SIGNAL INTERPOLATION CIRCUIT

BACKGROUND OF THE INVENTION

The present invention relates to a signal processing circuit for a color video printer which depicts a color print close in quality to a photograph on a printing paper on the basis of a color video signal.

Regarding prior-art color video printers, 'IEEE Transactions on Consumer Electronics, Vol. CE-28, No. 3, August 1982' contains a paper entitled "Color Video Picture Printer" by Sohei Masuda, and 'IEEE Transactions on Consumer Electronics, Vol. CE-31, No. 3, August 1985' contains a paper entitled "A COLOR VIDEO PRINTER WITH SUBLIMATION DYE TRANSFER METHOD" by Yasunori Kobori et al. who are the inventors of the present invention.

As stated in the papers, with the prior-art video printers, a video signal of one frame is disjoined into R (red), G (green) and B (blue) signals which are the components of a color signal or into Cy (cyan), Ye (yellow) and Mg (magenta) signals which correspond to the color components of a coating material. The resulting signals are respectively converted into digital signals, which are first stored in dedicated semiconductor frame memories.

The respective color signals are read out and printed in a predetermined order. In this case, the frame memories and analog-to-digital converters (hereinbelow, termed A/D converters) for converting the color signals are driven at an identical clock frequency. Therefore, all the video signals can be uniformly stored in the frame memories within the frame period thereof (33 msec, in the NTSC format, and 40 msec. in the PAL format).

Since, however, each of the prior-art video printers requires A/D converters and frame memories for the respective color signals, the circuit arrangement thereof becomes complicated. It also has a problem in the aspect of cost because a large number of RAMs (random access memories) are needed as the frame memories, and at least three A/D converters are needed.

SUMMARY OF THE INVENTION

An object of the present invention is to reduce the memory capacity of memory means for storing video signals.

Another object of the present invention is to provide a signal processing circuit for a video printer which has a simple circuit arrangement.

The color video printer of the present invention comprises a first memory for storing the first color signal which requires the largest amount of information among the three color signals of a color video signal, and a second memory for storing the remaining second and third color signals. The color signal to be stored in the second memory is input at a sampling rate lower than that of the color signal to be stored in the first memory.

The color video printer further comprises an interpolation circuit by which the color signal stored in the second memory is interpolated to reproduce data.

BRIEF DESCRIPTION OF THE DRAWINGS

FIG. 2a is an explanatory diagram of an output signal from a synthesis switch in FIG. 1a or 1b, while FIGS. 2b and 2c are explanatory diagrams of digital color signals respectively separated from the signal shown in FIG. 2a;

FIG. 3 is an explanatory diagram showing a printing operation in FIG. 1a or 1b;

FIGS. 6a and 6b and FIGS. 7a and 7b are explanatory diagrams showing the data interpolation operations in FIG. 4 respectively;

FIG. 13 is an explanatory diagram showing the positional relations between lacking parts and picture element parts in the practicable example of FIG. 12;

FIG. 14 is an explanatory diagram showing a contour correction effect in the practicable example of FIG. 12; and FIG. 15 is an explanatory diagram showing a method of detecting the change of a digital G-signal in the practicable example of FIG. 12.

DETAILED DESCRIPTION OF THE PREFERRED EMBODIMENTS

Now, embodiments of the present invention will be described with reference to the drawings.

Figure 1A:
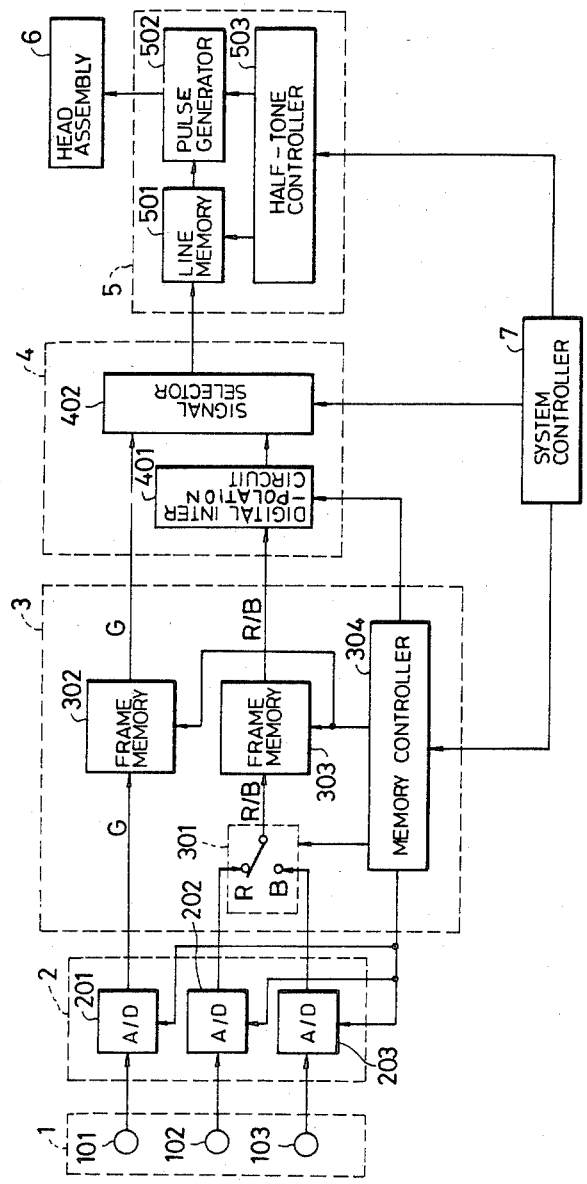
FIGS. 1a and 1b are block diagrams each showing an embodiment of a signal processing circuit for a video printer according to the present invention.

FIG. 1a is a block diagram showing an embodiment of a signal processing circuit for a video printer according to the present invention.

The signal processing circuit of the video printer in this embodiment is constructed of a signal input portion 1 which is supplied with R, G and B signals, an A/D conversion portion 2 which digitizes the color signals, a memory portion 3 which stores the respective digital color signals, a digital processing portion 4 which processes and selects respective reference signals read out of the memory portion 3, a signal conversion portion 5 which converts color signals from the digital processing portion 4 into signals required for printing and supplies the latter to a head assembly 6, and a system controller 7 which controls the above blocks.

The signal input portion 1 consists of an R-signal input terminal 102 to which the R signal is input, a G-signal input terminal 101 to which the G signal is input, and a B-signal input terminal 103 to which the B signal is input.

The A/D conversion portion 2 is constructed of A/D converters 201, 202 and 203.

The memory portion 3 consists of a frame memory 302 which stores the G signal, a frame memory 303 which stores the R signal and the B signal, a synthesis switch 301 by which the signals to be stored in the frame memory 303 are switched, and a memory controller 304 which controls the synthesis switch 301, the frame memories 302, 303, the A/D converters 201, 202, 203, and a digital interpolation circuit 401.

The digital processing portion 4 is constructed of the digital data interpolation circuit (hereinbelow, termed "digital interpolation circuit) 401 which synthesizes the R signal and B signal on the basis of the signals from the frame memory 303 of the memory portion 3, and a signal selector 402 by which the R signal or B signal from the digital interpolation circuit 401 and the G signal from the frame memory 302 are output in the order of printing.

The signal conversion portion 5 consists of a one-line memory 501, a pulse generator 502 and a half-tone controller 503. The pulse generator 502 converts data stored in the one-line memory 501 into a signal of pulse width corresponding to a half-tone control signal from the half-tone controller 503 and supplies the latter to the head assembly 6.

Next, the operation of this embodiment will be described.

The G signal, R signal and B signal are respectively input to the input terminals 101, 102 and 103 of the signal input portion 1, and they are supplied to the A/D conversion portion 2. In the A/D conversion portion 2, these color signals are converted into the digital signals of, e.g., 6 bits at the same timing by the A/D converters 201, 202 and 203 which are controlled by the memory controller 304 of the memory portion 3, whereupon the digital signals are supplied to the memory portion 3. In the memory portion 3, the G signal digitized by the A/D converter 201 (hereinbelow, termed "digital G-signal $E_{DG}$") is immediately written into the frame memory 302. On the other hand, the R signal digitized by the A/D converter 202 (hereinbelow, termed "digital R-signal $E_{DR}$") and the B signal digitized by the A/D converter 203 (hereinbelow, termed "digital B-signal $E_{DB}$") are written into the common frame memory 303 through the synthesis switch 301.

Here, letting $E_Y$ denote the intensity of a luminance signal, and $E_R$, $E_G$ and $E_B$ denote the intensities of the R, G and B color signals respectively, the following holds:

$$E_Y = 0.30E_R + 0.59E_G + 0.11E_B \qquad (1)$$

This indicates that the luminance signal $E_Y$ is obtained by mixing 30% of the R color signal $E_R$, 59% of the G color signal and 11% of the B color signal.

Accordingly, when the amount of information of the G color signal $E_G$ necessary for reproducing the luminance signal $E_Y$ is expressed by 1 (one), the amount of information of the R color signal $E_R$ may be about $\frac{1}{2}$, and that of the B color signal $E_B$ may be as small as about 1/5.

In the present invention, therefore, the G color signal $E_G$ is A/D-converted at a sampling frequency $f_G$ so as to store the digital signal in the memory 302, whereas the R or B color signal $E_R$ or $E_B$ is A/D-converted at a sampling frequency of $\frac{1}{2} f_G$ so as to store the digital signal in the frame memory 303.

More specifically, the A/D converters 201, 202 and 203 A/D-convert the G, R and B color signals $E_G$, $E_R$ and $E_B$ supplied from the corresponding terminals 101, 102 and 103 at the identical frequency $f_G$, respectively. Since the resulting digital R signal $E_{DR}$ and digital B signal $E_{DB}$ are alternately sampled by the synthesis switch 301 and are then written into the frame memory 303, the R and B color signals are, in effect, A/D-converted at the frequency $\frac{1}{2} f_G$.

Figure 1B:
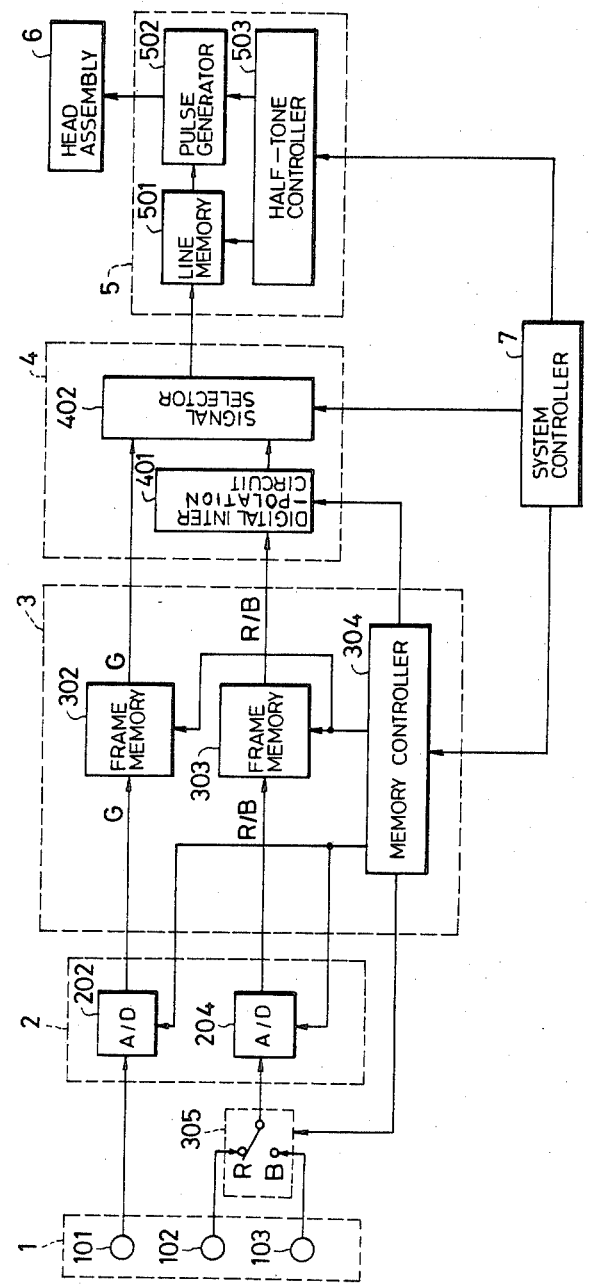

Alternatively, the analog R color signal $E_R$ and B signal $E_B$ may well be alternately input to a common A/D converter as shown in FIG. 1b.

Referring to FIG. 1B, the input terminals 102 and 103 are connected to the input terminals of a synthesis switch 305. The output end of the synthesis switch 305 is connected to the input end of the common A/D converter 204, the output end of which is connected to the frame memory 303.

Since the R color signal $E_R$ and B color signal $E_B$ applied to the respective input terminals 102 and 103 are alternately supplied to the A/D converter 204 by the synthesis switch 305, the digital R signal $E_{DR}$ and digital B signal $E_{DB}$ are alternately stored in the frame memory 303. Also in the circuit shown in FIG. 1b, the R color signal $E_R$ and the B color signal $E_B$ are sampled at a frequency equal to half of that of the G color signal $E_G$ as in the circuit shown in FIG. 1A.

FIG. 2a shows data items which are to be stored in the frame memory 303. ⓇR indicates the digital R signal $E_{DR}$, the ⒷB the digital B signal $E_{DB}$. The digital R signal $E_{DR}$ and the digital B signal $E_{DB}$ are stored dot-sequentially. (The signal in which the digital R signal $E_{DR}$ and the digital B signal $E_{DB}$ appear dot-sequentially is called "R/B signal".)

At this time, the amount of information of each of the digital R and B signals $E_{DR}$, $E_{DB}$ which constitute the R/B signal is $\frac{1}{2}$ of that of the digital G signal $E_{DG}$. Since, however, the sampling points of the R/B signal and those of the digital G signal are equal in number, the memory capacity of the frame memory 303 for storing the R/B signal is equal to that of the frame memory 302 for storing the digital G signal $E_{DG}$.

On the basis of this fact, the embodiment reduces the memory capacity of the memory portion to $\frac{2}{3}$ times as compared with the prior art in which the frame memories are provided for the respective digital color signals.

When the digital G, R and B signals $E_{DG}$, $E_{DR}$, $E_{DB}$ for the video signal of one frame have been stored in the frame memories 302 and 303, they are subsequently read out from these frame memories. That is, the digital G signal $E_{DG}$ is read out from the frame memory 302, and the R/B signal is read out from the frame memory 303, to be supplied to the digital processing portion 4.

Either of the digital R and B signals is extracted from the R/B signal supplied to the digital interpolation circuit 401.

Since the extracted digital R signal $E_{DR}$ or digital B signal $E_{DB}$ has been sampled at the sampling frequency equal to $\frac{1}{2}$ of that of the digital G signal $E_{DG}$, the amount of information thereof is insufficient.

The digital R signal $E_{DR}$ extracted from the R/B signal by the digital interpolation circuit 401 is shown in FIG. 2b, and the digital B signal $E_{DB}$ is shown in FIG. 2c. In these digital color signals $E_{DR}$ and $E_{DB}$, the signals (hereinbelow, termed "picture elements") of sampling points (hereinbelow, termed "dots") are denoted by Ⓡ and Ⓑ, and the dots (hereinbelow, termed "lacking parts") where the picture elements are missed by the synthesis switch 301 are denoted by marks x. Regarding one frame, as shown in FIGS. 2b and 2c, the digital R and G signals $E_{DR}$ and $E_{DB}$ extracted from the R/B signal are respectively such that the picture elements Ⓡ and the lacking parts x are alternately arrayed and that the picture elements Ⓑ and the lacking parts x are alternately arrayed.

The digital interpolation circuit 401 interpolates the signals of the lacking parts x by the use of the signals of the dots of the actually existing picture elements Ⓡ and Ⓑ, thereby to form the digital R and B signals $E_{DR}$ and $E_{DB}$ whose information quantities are increased.

The signal selector 402 selects the digital G signal $E_{DG}$ from the frame memory 302 and the digital R signal $E_{DR}$ or B signal $E_{DB}$ from the digital interpolation circuit 401 in succession in the order of printing and supplies them to the signal conversion portion 5.

First, in order to print a green image, the digital G signal $E_{DG}$ is selected, and the signals thereof corresponding to one frame are supplied to the signal conversion portion 5. Subsequently, in order to print a red or blue image, the output signal of the digital interpolation circuit 401 is selected. In the digital processing portion 4, in the period during which the digital interpolation circuit 401 is selected, this circuit 401 extracts the digital R signal $E_{DR}$ from the R/B signal in order to first print red. The digital R signal $E_{DR}$ extracted and subjected to the interpolation processing is supplied to the signal conversion portion 5 by the signal selector 402. In order to subsequently print blue, the digital interpolation circuit 401 extracts the digital B signal $E_{DB}$ from the R/B signal. The extracted and interpolated digital R signal $E_{DR}$ is supplied to the signal conversion portion 5. Such selecting operations of the signal selector 402 are performed under the control of the system controller 7.

In the signal conversion portion 5, the signals of one line from the digital color signal $E_{DG}$, $E_{DR}$ or $E_{DB}$ input from the signal selector 402 are held in the line memory 501. Under the control of the half-tone controller 503, all the picture elements held in the line memory 501 are simultaneously converted into gradation pulses conforming to the respective information contents by means of the pulse generator 502. At the same time, the gradation pulses are supplied to the head assembly 6 to effect the printing.

Here, the signals corresponding to one line consists of signals which correspond to a column of picture elements arrayed in a direction perpendicular to the horizontal scanning direction of a television screen. As illustrated in FIG. 3, the gradation pulses obtained by converting the signals of the picture elements of a line signal are simultaneously applied to the respective heads 6a, 6b, . . . of the head assembly 6 which are arranged in the vertical direction (as viewed on the drawing) of printing paper P, whereby the information is printed on the printing paper P.

In FIG. 3, the moving direction of the head assembly 6 relative to the printing paper P is as indicated by an arrow. In the signal conversion portion 5, the digital color signals of one line are held in the line memory 501 every frame of the applied digital color signal $E_{DG}$, $E_{DR}$ or $E_{DB}$. Accordingly, the head assembly 6 prints line by line rightwards from the left end of the printing paper P as it moves relative to the printing paper P. In addition, the head assembly 6 first prints the green image over the whole area of the printing paper P on the basis of the G signal $E_{DG}$, subsequently prints the red image on the basis of the R signal $E_{DR}$ and further prints the blue image on the basis of the B signal $E_{DB}$, thereby to print one video image on the printing paper P. The above printing order is appointed by the half-tone controller 503 under the control of the system controller 7 shown in FIG. 1a and FIG. 1b.

Although color signals which are actually supplied for the printing are cyan (Cy), yellow (Ye) and magenta (Mg) signals, the R, G and B signals have been used for the description. The Cy, Ye and Mg signals are obtained by converting the R, G and B signals, and the conversion may be executed in the digital processing portion 4 by way of example. Alternatively, color signals to be applied to the input portion 1 may be the Cy, Ye and Mg signals.

As described above, since the digital R signal $E_{DR}$ and the digital B signal $E_{DB}$ are stored in the same memory 303, the memory capacity of the memory portion 3 is reduced. Although the amounts of information of the digital R signal $E_{DR}$ and B signal $E_{DB}$ decrease on account of the synthesis switch 301, the lacking information contents are supplemented by the digital interpolation circuit 401. Therefore, the degration of the picture quality of a printed picture can be prevented.

Next, practicable examples of the digital interpolation circuit 401 in FIG. 1a or 1b will be described.

Figure 4:
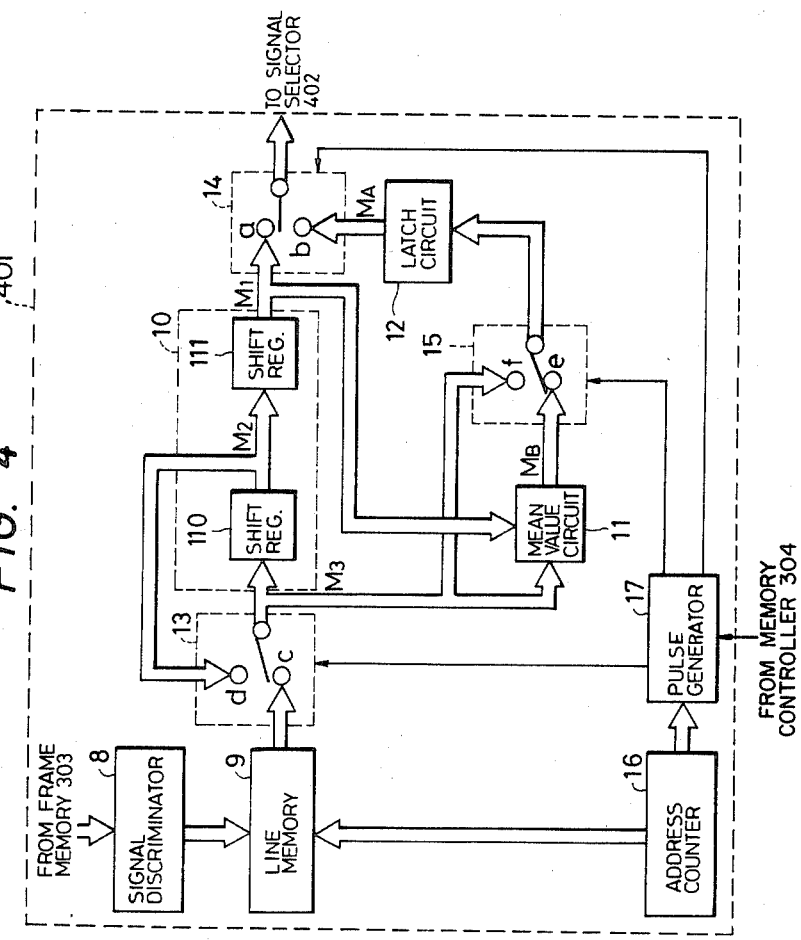
FIG. 4 is a block diagram showing a practical example of a digital interpolation circuit in FIG. 1a or 1b.

FIG. 4 is a block diagram showing one practicable example of the digital interpolation circuit 401. This digital interpolation circuit 401 consists of a signal discriminator 8, a line memory 9, a shift register group 10 which is constructed of shift registers 110 and 111, a mean value circuit 11, a latch circuit 12, switches 13, 14 and 15, an address counter 16, and a pulse generator 17.

Figures 5A, 5B:
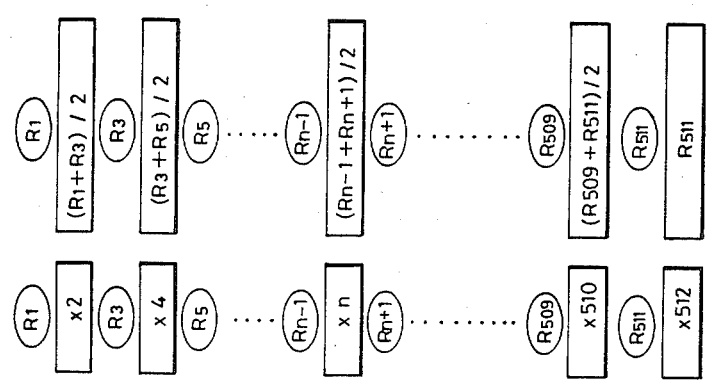
FIGS. 5a and 5b are schematic diagrams showing digital color signals before and after the data interpolation of the practicable example respectively.

Referring to the figure, the R/B signal from the frame memory 303 (FIG. 1a or 1b) is supplied to the signal discriminator 8, and either digital color signal $E_{DR}$ or $E_{DB}$ is extracted. For the sake of explanation, it is assumed here that the digital R signal $E_{DR}$ is extracted. Then, signals corresponding to one line of the digital R signal $E_{DR}$ are stored in the line memory 9. This digital R signal for one line (namely, the line signal) $E_{DR}$ is stored in the line memory 9 in such a manner that, as shown in FIG. 5a, data items corresponding to picture elements Ⓡ and data items corresponding to lacking parts

are alternately arrayed in the order of

 , . . . .

Here, it is assumed that one line is composed of 512 picture elements and that

Ⓡ₁ is the picture element at the uppermost part of a frame, while

is the part where the picture element $(R_{512})$ at the lowermost part is missing.

This digital interpolation circuit 401 carries out the data interpolation on the basis of an interpolating method to be stated below.

As illustrated in FIG. 5a, odd-numbered dots have the data of the picture elements, whereas even-numbered dots are the lacking parts and have no data. Now, letting $R_{2n-1}$ and $R_{2n+1}$ denote the data items (hereinbelow, termed "picture element data") of the respective picture elements $\boxed{R_{2n-1}}$ and $\boxed{R_{2n+1}}$, and $C_{2n}$ denote a data item (hereinbelow, termed "interpolation data") to be interpolated in the lacking part $\boxed{x_{2n}}$ between them, the following operation is executed:

$$C_{2n}=(R_{2n-1}+R_{2n+1})/2 \qquad (1)$$

That is, the mean value of the picture element data of the upper and lower picture elements is used as the interpolation data of the lacking part $x_{2n}$. The interpolation based on this operation is executed for all the lacking parts x. This interpolation is not applicable to the last lacking part $\boxed{x_{512}}$.

As the interpolation data $C_{512}$ therefor, the picture element data $R_{511}$ of the picture element $\boxed{R_{511}}$ located above is used. That is, the following operation is executed:

$$C_{512}=R_{511} \qquad (2)$$

Owing to the execution of such interpolation, the digital R signal $E_{DR}$ for one line becomes as shown in FIG. 5b.

Hereunder, the operation of the practicable example of the digital interpolation circuit 401 (as shown in FIG. 1) in FIG. 4 as based on the above-stated interpolation method will be explained.

The picture element data $R_{2n+1}$ and the data $C_{2n}$ of the lacking part $x_{2n}$ are read out from the line memory 9 successively in a downward sequence shown in FIG. 5a, in accordance with address signals from the address counter 16 which is operated by the clock of the memory controller 304 (FIG. 1a or 1b). The address signals produced from the address counter 16 are also supplied to the pulse generator 17. The pulse generator 17 generates switching pulses for switching the switches 13, 14 and 15 in accordance with the address values of the address signals from the address counter 16. When transferring data to the shift register 110, the switch 13 is thrown to the contact c side thereof, so that the picture element data $R_{2n+1}$ and the lacking part data $x_{2n}$ from the line memory 9 are transferred toward the shift registers 110 and 111 through the switch 13 in synchronism with the clock from the memory controller 304. When the output $M_1$ of the shift register 111 is the picture element data owing to the transfer, the switch 14 is thrown to the contact a side thereof by the switching pulse from the pulse generator 17, and this picture element data item $R_{2n+1}$ is supplied to the signal selector 402 (FIG. 1a or 1b) through the switch 14. In contrast, when the output $M_1$ of the shift register 111 is the lacking part data $x_{2n}$, the switch 14 is thrown to the contact b side, and the output $M_A$ of the latch circuit 12 is supplied as the interpolation data $C_{2n}$ to the signal selector 402 through the switch 14.

This interpolation data item $C_{2n}$ is formed as follows:

Assuming now that the data of the output $M_3$ of the line memory 9 be $D_{2n}$, the data items of the outputs $M_2$ and $M_1$ of the shift registers 110 and 111 are $D_{2n-1}$ and $D_{2n-2}$ respectively. The output $M_3$ of the line memory 9 and that $M_1$ of the shift register 111 are supplied to the mean value circuit 11, to calculate the mean value of them. Accordingly, the data $D_{2'n-1}$ of the output $M_B$ of the mean value circuit 11 becomes:

$$D_{2'n-1}=(D_{2n}+D_{2n-2})/2$$

At this time, the latch circuit 12 latches data $D_{2'n-2}$ one clock time before the mean value circuit 11 delivers the data $D_{2'n-1}$. Accordingly, the data of the output $M_A$ of the latch circuit 12 is:

$$D_{2'n-2}=(D_{2n-1}+D_{2n-3})/2$$

In general, when the data of the output $M_1$ of the shift register 111 is $D_{2i}$, the data of the output $M_B$ of the mean value circuit 11 is:

$$D_{2'i+1}=(D_{2i}+D_{2i+2})/2$$

and the data of the output $M_A$ of the latch circuit 12 is:

$$D_{2'i}+(D_{2i-1}+D_{2i+1})/2$$

It is now assumed that, as shown in FIG. 5a, the odd-numbered dots in a certain line be the picture elements $(R_1)$, $(R_3)$, $(R_5)$, ..., while the even-numbered dots be the lacking parts $\boxed{x_2}$, $\boxed{x_4}$, ... In addition, picture element data for such picture elements is assumed data $D_{2i-1}$ with suffixes of odd numbers, and picture element data for such lacking parts is assumed data $D_{2i}$ with suffixes of even numbers.

It is assumed that, at a certain point of time, the data of the output $M_1$ of the shift register 111 is $D_{2n-1}$, while the output $M_2$ and input $M_3$ of the shift register 110 is $D_{2n}$ and $D_{2n+1}$ respectively. Then, the odd-numbered data $D_{2n-1}$ of the output $M_1$ of the shift register 111 is the picture element data and therefore requires no interpolation. The switch 14 is thrown to the contact a side, and this data item $D_{2n-1}$ passes through the switch 14 to be fed into the signal selector 402 (FIG. 1a or 1b). On this occasion, the latch circuit 12 is continually supplied with the output $M_B$ of the mean value circuit 11 for the picture element data items:

$$D_{2n}'=(D_{2n-1}+D_{2n+1})/2$$

through the switch 15 which is thrown on the contact e side thereof. The latch circuit 12, however, still holds the data $D_{2n-2}'[=(D_{2n-2}+D_{2n})/2]$ of the preceding output $M_B$ of the mean value circuit 11.

When the signal selector 402 has received the data $D_{2n-1}$ of the output $M_1$ of the shift register 111, the latch circuit 12 latches the aforementioned data $D_{2n}'$ of the output $M_B$ of the mean value circuit 11. Subsequently, when the shift register 111 is fed with the data $D_{2n}$ of the output $M_2$ of the shift register 110 and this shift register 110 is fed with the data $D_{2n-1}$ at the input $M_3$ thereof, the output $M_1$ of the shift register 111 is the lacking part data $x_{2n}$, and hence, the switch 14 is changed-over to the contact b side. Therefore, the data $D_{2n}'$ of the output $M_A$ of the latch circuit 12 is fed into the signal selector 402 through the switch 14. Since this data item $D_{2n}'$ is the mean value of the picture element data as indicated by the last equation, it becomes the interpolation data $C_{2n}$ for the 2n-th lacking part $$\boxed{x_{2n}}$$

in the line. At this time, the data $D_{2n+1}'$ of the output $M_B$ of the mean value circuit 11 is:

$$D_{2n+1}'=(D_{2n}+D_{2n+1})/2$$

This is the mean of the two lacking part data items $D_{2n}$ and $D_{2n+1}$.

When the signal selector 402 has received the data $D_{2n}'$ from the latch circuit 12, this latch circuit 12 latches the aforementioned $D_{2n+1}'$ of the output $M_B$ of the mean value circuit 11. Subsequently, the shift register 111 is fed with the data $D_{2n+1}$ of the output $M_2$ of the shift register 110, and this shift register 110 is fed with the date $D_{2n+2}$ of its input $M_3$. Simultaneously therewith, the input $M_3$ of the shift register 110 becomes data $D_{2n+3}$, and the switch 14 is thrown to the contact a side.

In this way, when the output $M_1$ of the shift register 111 is the odd-numbered data and the picture element data $R_{2n+1}$, this data item is fed into the signal selector 402, and when it is the even-numbered data and the lacking part data $x_{2n}$, the mean value of the picture element data items $R_{2n}$ and $R_{2n+1}$ before and after the lacking part data is fed into the signal selector 402 as the interpolation data $C_{2n}$.

In the above, odd-numbered dots in one line have been the picture elements, and the even-numbered dots have been the lacking parts as shown in FIG. 5a. In the reverse case, as illustrated in FIG. 6b, the switch 14 is thrown to the a side when the output $M_1$ of the shift register 111 is any of even-numbered data items $D_{2m-2}$, $d_{2m}$, ..., and it is thrown to the b side when the output $M_1$ is any of odd-numbered data items $D_{2m-1}$, $D_{2m+1}$, .... The other operations are similar to those in the foregoing.

Although the above interpolation is valid for the lacking parts $$\boxed{x_2} \sim \boxed{x_{510}}$$

in FIG. 5a, such interpolation data $C_{512}$ cannot be created for the lacking part $$\boxed{x_{512}}.$$

As explained before, the interpolation of this lacking part $$\boxed{x_{512}}$$

is to put the picture element data $R_{511}$ of the picture element $$\boxed{R_{511}}$$

as the interpolation data $C_{512}$. Next, this interpolation operation will be described with reference to FIG. 7a.

Assuming in FIG. 4 that the input $M_3$ of the shift register 110 be the picture element data $D_{511}$ of the final picture element $$\boxed{R_{511}},$$

the data of the output $M_1$ of the shift register 111 is $D_{509}$, and this is supplied to the signal selector 402 (FIG. 1a or 1b) through the switch 14. Simultaneously, the data $D'_{510}$ of the output $M_B$ of the mean value circuit 11 is latched in the latch circuit 12. Here, the data $D'_{510}$ is:

$$D'_{510}=(D_{509}+D_{511})/2$$

Subsequently, when the input $M_3$ is stored in the shift register 110 and the output $M_2$ (data $D_{510}$) of this shift register 110 is stored in the shift register 111, the switch 13 is thrown to the d side thereof. Thus, the data items of the input $M_3$ and output $M_2$ of the shift register 110 become equal to $D_{511}$. On this occasion, the switch 14 is thrown to the b side, and the output $M_A$ of the latch circuit 12 is supplied to the signal selector 402 as the interpolation data of the lacking part $$\boxed{x_{510}}.$$

Further, when the output $M_2$ of the data $D_{511}$ from the shift register 110 is stored in the shift register 111 and the input $M_3$ of the data $D_{511}$ is stored in the shift register 110, all the data items of the input $M_3$ and output $M_2$ of the shift register 110 and the output $M_1$ of the shift register 111 become $D_{511}$. The switch 14 is thrown to the a side thereof, and the data $D_{511}$ of the output $M_1$ of the shift register 111 is supplied to the signal selector 402. Simultaneously therewith, the data of the output $M_B$ of the mean value circuit 11 becomes the mean value between the data $D_{511}$ of the input $M_3$ of the shift register 110 and the data $D_{511}$ of the output $M_1$ of the shift register 111, that is, the data $D_{511}$ itself, and this is latched in the latch circuit 12.

Further, when the output $M_2$ of the shift register 110 is stored in the shift register 111 and the input $M_3$ of this shift register 110 is stored therein, the switch 14 is changed-over to the b side thereof, and the output $M_A$ of the data $D_{511}$ from the latch circuit 12 is supplied to the signal selector 402 through the switch 14. This is the interpolation data of the lacking part $$\boxed{x_{512}}$$

in FIG. 5a.

Next, a case where the first dot of a line is a lacking part unlike the arrayal of FIG. 5a will be described with reference to FIG. 7b.

When the readout of the line memory 9 is started with the switch 13 thrown to the c side thereof, the data $D_1$ of the first input $M_3$ of the shift register 110 is lacking part data. When this data item $D_1$ is stored in the shift register 110, the output $M_2$ thereof becomes data $D_1$ and the input $M_3$ thereof becomes data $D_2$. At this time, the switch 15 is thrown to the f side thereof, the latch circuit 12 latches the data $D_2$ of the input $M_3$ of the shift register 110. This data item $D_2$ is the first picture element data $R_1$ in the line. Thus far, the shift register 111 holds indefinite data, and the signal selector 402 is not fed with the output of the digital interpolation circuit 401.

Subsequently, the shift register 111 is fed with the data $D_1$ of the output $M_2$ of the shift register 110, and the shift register 110 is fed with the data $D_2$ of the input $M_3$ thereof. Accordingly, the output $M_1$ of the shift register 111 becomes the data $D_1$, and that $M_2$ of the shift register 110 becomes the data $D_2$. Besides, the input $M_3$ of the shift register 110 becomes data $D_3$. At this time, the data $D'_2$ of the output $M_B$ of the mean value circuit 11 becomes:

$$D'_2 = (D_1 + D_3)/2$$

and the output $M_A$ of the latch circuit 12 is the data $D_2$. Further, the switch 15 is changed-over to the e side thereof, but the latch circuit 12 continues to hold the data $D_2$.

Therefore, the output $M_1$ of the shift register 111 is the lacking part data $D_1$, the switch 14 is thrown to the b side, and the data $D_2$ of the output $M_A$ of the latch circuit 12 is fed into the signal selector 402 through the switch 14 as the first output data of the digital interpolation circuit 401.

Subsequently, when the shift register 111 is fed with the data $D_2$ of the output $M_2$ of the shift register 110 and the shift register 110 is fed with the data $D_3$ of the input $M_3$ thereof, the switch 14 is changed-over to the a side, and the data $D_2$ of the output $M_1$ of the shift register 111 is fed into the signal selector 402 through the switch 14. Simultaneously therewith, the data $D_3'$ of the output $M_B$ of the mean value circuit 11 becomes:

$$D_3' = (D_2 + D_4)/2$$

This is latched in the latch circuit 12, but is interrupted by the switch 14.

Thenceforth, operations are similar to those in the foregoing. In this way, the first lacking part of the line is supplemented by the succeeding picture element.

To sum up the above operations, in the line which consists of, for example, 512 data items held in the line memory 9, intermediate lacking parts (second to 511th data items) are interpolated using the mean values (mean data) of the picture element data items before and after them, and when lacking parts at both the ends of the line (first and 512th data items) need to be interpolated, the second picture element data $R_2$ is substituted for the first lacking part $x_1$ and the 511th picture element data $R_{511}$ is substituted for the 512th lacking part $x_{512}$. This method of data interpolation is performed in the direction of the line to be printed, namely, in the vertical direction of the surface of the monitor in FIG. 3.

Figure 8:
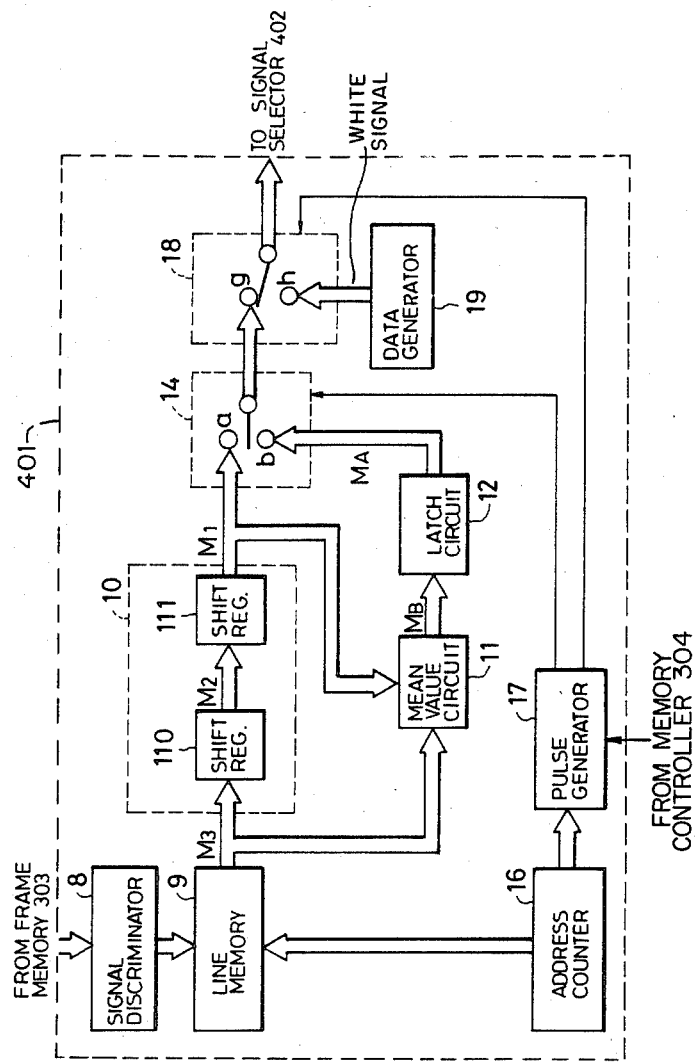
FIG. 8 and FIG. 9 are block diagrams each showing another practicable example of the digital interpolation circuit in FIG. 1a or 1b.

FIG. 8 shows another practicable example of the digital interpolation circuit 401. This digital interpolation circuit 401 is provided anew with a switch 18 and a data generator 19. The same portions as in the circuit shown in FIG. 4 are assigned identical symbols, and shall not be repeatedly explained.

In the foregoing practicable example shown in FIG. 4, the first or last lacking part of each line has been interpolated with the directly succeeding or directly preceding picture element data respectively. In this practicable example shown in FIG. 8, the first or last dot of each line (in FIG. 5a, the parts of the picture element $$\textcircled{R_1}$$

or the lacking part $$\boxed{x_{512}} \; )$$

is interpolated with a predetermined data item, for example, white level data whose bits are all "1". As a result, in the case of the interpolation with the white level data, the number of picture elements per line of a printed image becomes 510 which is about 0.4% smaller than the number of 512, but quite no problem is posed in vision.

Next, the operation of this practicable example will be explained.

Referring to FIG. 8, the switch 18 is thrown to the contact g side thereof as to the second to 511th parts of the line. As in the practicable example shown in FIG. 4, when the output $M_1$ of the shift register 111 is picture element data $R_{2n}$, the switch 14 is thrown to the contact a side, and this data item is fed into the signal selector 402 (FIG. 1a or 1b (through the switches 14 and 18. When the output $M_1$ of the shift register 111 is lacking part data $x_{2n+1}$, the switch 14 is thrown to the contact b side, and the output $M_A$ of the latch circuit 12 is fed into the signal selector 402 through the switches 14 and 18 as interpolation data $C_{2n+1}$.

When the output $M_1$ of the shift register 111 is data $R_1$ or $R_{512}$ expressive of the first of last part of the line, the switch 18 is changed-over to the h side thereof by a switching pulse from the pulse generator 17, and the data of a predetermined value provided by the data generator 19 is fed into the signal selector 402 through the switch 18 as interpolation data $C_1$ or $C_{512}$. When the data of the predetermined value is assumed to be data in which all bits are "1", it is not printed on a printing paper. Accordingly, the uppermost part and lowermost part of each line on a printed frame become a white state when this processing is performed for the digital G, R and B signals.

Thus, with this practicable example, the switches 13 and 15 in FIG. 4 are dispensed with to simplify the circuit arrangement, and to simplify the interpolation processing. Moreover, with the practicable example of FIG. 4, the edges of the printed frame have undesired colors and are conspicuous, whereas with the practicable example of FIG. 8, white edges are formed and are not problematic.

In the above practicable examples, the number of the heads in the head assembly 6 (FIG. 1a or 1b) has been equal to the number of picture elements per line (the number of 512). However, the number of heads may well be reduced by two to 510 so as to print the second to 511the picture element data in the line by means of the 510 heads. In this case, the first and last dots of the line need not be interpolated, and effects similar to those of the practicable example shown in FIG. 8 are attained. In addition, similar effects are attained when the number of picture elements of one line has been increased by two to 514 in which the sixth to 513th picture elements are used as data $R_6$-$R_{513}$, and the first to 512th parts are subjected to the data interpolation based on the mean values, only these parts being printed.

Figure 9:
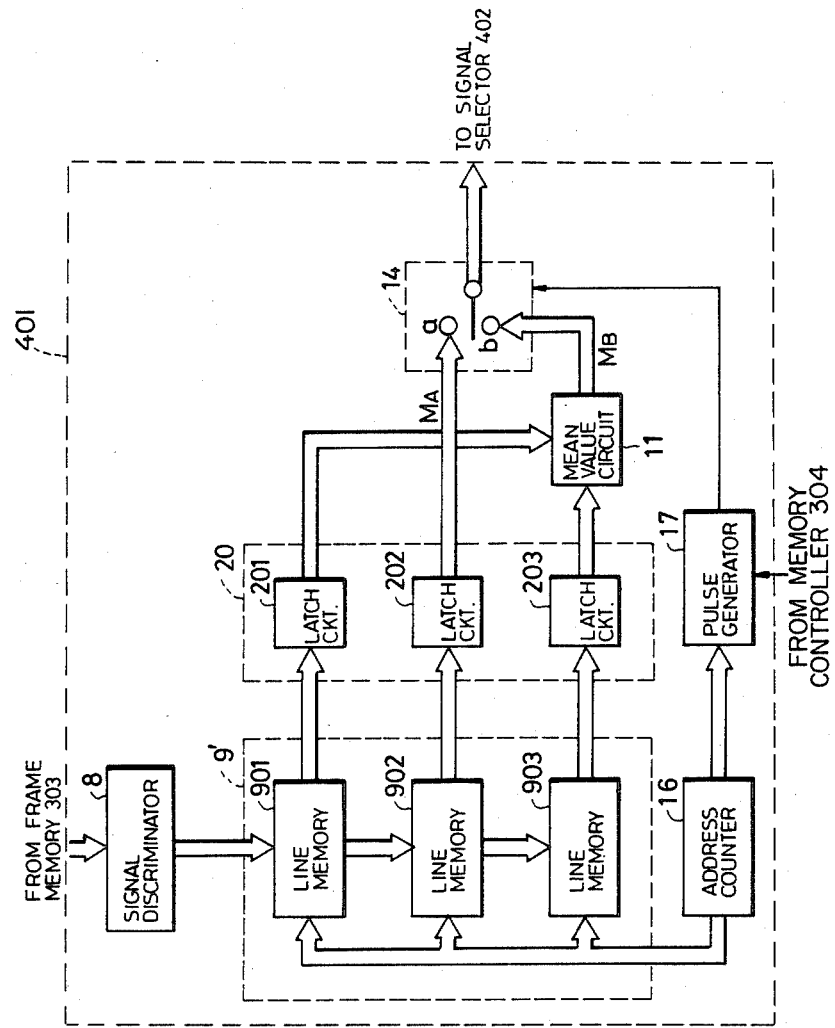

FIG. 9 shows still another practicable example of the digital interpolation circuit 401 in FIG. 1.

In this practicable example, a line memory portion 9' including line memories 901, 902 and 903, and a latch portion 20 including latch circuits 201, 202 and 203 are added anew to the practicable example of FIG. 4. The same parts as in FIG. 4 are assigned identical symbols, and shall not be repeatedly explained.

Each of the foregoing practicable examples has interpolated the lacking part in the line with the mean value of the picture element data items $R_{2n-1}$ and $R_{2n+1}$ of the same line, whereas this practicable example interpolates it with the mean value of the picture element data $R_{2l-1, 2n}$ and $R_{2l+1, 2n}$ of both the adjacent lines.

Next, the operation of this practicable example will be described with reference to FIG. 10.

Now, a line where a lacking part is to be interpolated is assumed the 2l-th line, which is expressed by $L_{2l}$. Then, the (2l−1)-th line directly preceding the line $L_{2l}$ is denoted as $L_{2l-1}$, and the (2l+1)-th line directly succeeding the same is denoted as $L_{2l+1}$.

In FIG. 9, digital color signals from the signal discriminator 8 are supplied to the line memory portion 9'. In this regard, the line memory portion 9' consists of the three line memories 901, 902 and 903, in which the digital color signals of corresponding lines in a time-sequential order are respectively stored. Here, a line which is stored in the line memory 902 is the line to be fed into the signal selector 402 after the data interpolation. The immediately preceding line is stored in the line memory 903, and the immediately succeeding line in the line memory 901.

Assuming now that the digital color signals of the line $L_{2l}$ are stored in the line memory 902, those of the line $L_{2l-1}$ are stored in the line memory 903, and those of the line $L_{2l+1}$ are stored in the line memory 901. In addition, data items stored at the same addresses of the line memories 901, 902 and 903 are the data items of those sampling points of the lines stored in the respective memories which are arrayed in the horizontal direction of a frame. Accordingly, when data stored at a certain address of the line memory 902 is the picture element data of the corresponding line, data items stored at the same addresses of the line memories 901 and 903 are the lacking part data items of the corresponding lines.

Now, let's consider a case where the line $L_{2l}$ is stored in the line memory 902, the 2n-th address of which stores data $D_{2l, 2n}$. Then, the same addresses of the line memories 903 and 901 store data items $D_{2l-1, 2n}$ and $D_{2l+1, 2n}$, respectively. In FIG. 10, the lacking part data is indicated by ⊗.

When the (2n−2)-th addresses of the line memories 901, 902 and 903 are appointed by the address counter 16 and data $D_{2l, 2n-2}$ being picture element data is read out from the line memory 902 and latched in the latch circuit 202, lacking part data items ⊗ are read out from the line memories 901 and 903 and are respectively latched in the latch circuits 201 and 203. At this time, the switch 14 is thrown to the a side thereof, and the data $D_{2l, 2n-2}$ of the output $M_A$ of the latch circuit 202 is fed into the signal selector 402 (FIG. 1a or 1b) through the switch 14. Besides, the output $M_B$ of the mean value circuit 11 is the mean value between the lacking part data items of the outputs of the latch circuits 201 and 203.

Subsequently, when the address counter 16 appoints the next (2n−1)-th address, lacking part data ⊗ is read out from the line memory 902 and is latched in the latch circuit 202, and data items $D_{2l+1, 2n-1}$ and $D_{2l-1, 2n-1}$ being picture element data items are respectively read out from the line memories 901 and 903 and latched in the latch circuits 201 and 203. Then, the switch 14 is changed-over to the b side thereof, and the mean data of the data items $D_{2l+1, 2n-1}$ and $D_{2l-1, 2n-1}$ delivered as the output $M_B$ of the mean value circuit 11 is fed into the signal selector 402 through the switch 14 as interpolation data $D_{2l, 2n-1}$.

Subsequently, when the address counter 16 appoints the 2n-th address, data $D_{2l, 2n}$ being picture element data is read out from the line memory 902 and latched in the latch circuit 202, and lacking data items ⊗ are read out from the line memories 901 and 903. Accordingly, the switch 14 is thrown to the a side, and the data $D_{2l, 2n}$ of the output $M_A$ of the latch circuit 202 is fed into the signal selector 402 through the switch 14.

In this way, when the picture element data $D_{2l, 2n}$ is read out from the line memory 902, it is supplied to the signal selector 402, and when the lacking part data $D_{2l, 2n+1}$ is read out, the mean data of the picture element data items $D_{2l+1, 2n+1}$ and $D_{2l-1, 2n-1}$ read out from the line memories 901 and 903 is supplied to the signal selector 402 as the interpolation data $D_{2l, 2n+1}$.

When such processing operations for the line $L_{2l}$ have been completed, the line $L_{2l}$ is transferred from the line memory 902 to the line memory 903, and the line $L_{2l+1}$ is transferred from the line memory 901 to the line memory 902. Simultaneously therewith, the line $L_{2l+2}$ is supplied from the signal discriminator 8 to the line memory 901. Thus, the line $L_{2l+1}$ is similarly processed.

In this manner, the respective lines are successively subjected to the interpolation of the lacking parts and supplied to the signal selector. It is impossible, however, to subject the first line and the last line to such data interpolation of lacking parts. Regarding these lines, therefore, such processing may be performed as the data interpolation along the line as in the embodiment shown in FIG. 4, the substitution of the data expressive of white as in the embodiment shown in FIG. 8, or the check of the printing of these lines as explained before.

Figures 10, 11:
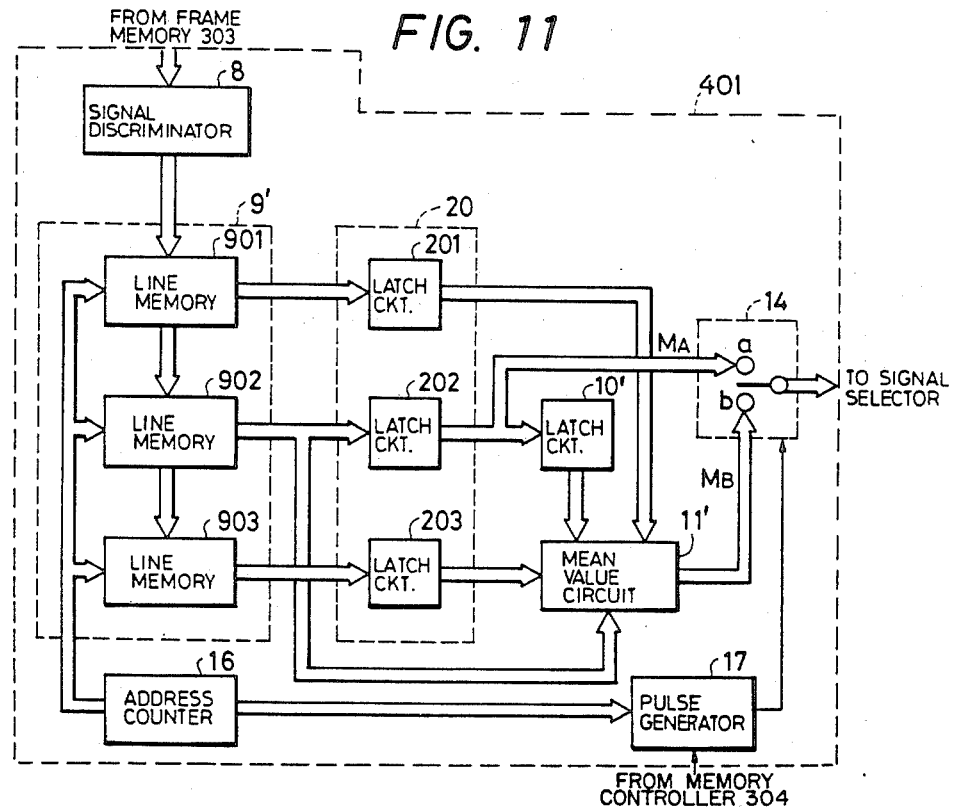
FIG. 10 is an explanatory diagram showing the operation of the practicable example shown in FIG. 9.
FIGS. 11 and 12 are block diagrams each showing still another practicable example of the digital interpolation circuit in FIG. 1a or 1b.

FIG. 11 shows still another practicable example of the digital interpolation circuit 401 in FIG. 1a or 1b.

As compared with the practicable example of FIG. 9, this example differs in a latch circuit 10' and a mean value circuit 11'. Portions corresponding to those in FIG. 4 and FIG. 9 are assigned the same symbols.

In this practicable example, interpolation data $D_{2l, 2n+1}$ is formed using the picture element data items $R_{n-1}$ and $R_{n+1}$ along the line in the practicable example shown in FIG. 4 and the picture element data items $D_{2l-1, 2n+1}$, $D_{2l+1, 2n+1}$ and $D_{2l, 2n+1}$ of the adjoining lines in the practicable example shown in FIG. 9.

The operation of this practicable example will be described with reference to FIG. 10.

It is now assumed that the lines $L_{2l+1}$, $L_{2l}$ and $L_{2l-1}$ be respectively stored in the line memories 901, 902 and 903. Assuming that the data items of the $(2n-1)$-th addresses of the line memories 901, 902 and 903 appointed by the address counter 16 be respectively latched in the latch circuits 201, 202 and 203, then the data latched in the latch circuit 201 is $D_{2l+1, 2n-1}$ and the data latched in the latch circuit 203 is $D_{2l-1, 2n-1}$, but the data latched in the latch circuit 202 is the lacking part data $\bigotimes$. Besides, data latched in the latch circuit 10' is data $D_{2l, 2n-2}$ stored at an address [the $(2n-2)$-th address] immediately preceding the address in the line memory 902, of the data latched in the latch circuit 202.

When, under such a state, the address counter 16 appoints the next $2n$-th address, the data $D_{2l, 2n}$ is read out from the line memory 902. In addition, the lacking part data items $\bigotimes$ are read out from the line memories 901 and 903. Therefore, the mean value circuit 11' creates the mean data $D'_{2l, 2n-1}$ among the data $D_{2l, 2n}$ from the line memory 902 and the data items $D_{2l+1, 2n-1}$, $D_{2l-1, 2n-1}$ and $D_{2l, 2n-2}$ respectively produced by the latch circuits 201, 203 and 10' and provides it as its output $M_B$. This mean data item $D'_{2l, 2n-1}$ is expressed as follows:

$$D'_{2l, 2n-1} = (D_{2l-1, 2n-1} + D_{2l+1, 2n-1} + D_{2l, 2n-2} + D_{2l, 2n})/4.$$

At this time, the switch 14 is thrown to the b side, and the data $D'_{2l, 2n-1}$ of the output $M_B$ of the mean value circuit 11' is fed into the signal selector 402 (FIG. 1a or 1b) through the switch 14 as the interpolation data for the lacking part data $\bigotimes$ of the output $M_A$ of the latch circuit 202.

When the interpolation data has been fed, the latch circuits 201, 202, 203 and 10' latch their inputs respectively, and simultaneously, the switch 14 is changed-over to the a side. Thus, the lacking part data items $\bigotimes$ are respectively latched in the latch circuits 201, 203 and 10', but picture element data $D_{2l, 2n}$ is latched in the latch circuit 202. The data $D_{2l, 2n}$ of the output $M_A$ of the latch circuit 202 is fed into the signal selector 402 through the switch 14.

Thenceforth, in a similar manner, when the output $M_A$ of the latch circuit 202 is the picture element data, it is fed into the signal selector 402 through the switch 14, and when the output $M_A$ is the lacking part data, the mean data among the picture element data from the line memory 902 and the picture element data items from the latch circuits 201, 203 and 10' as created by the mean value circuit 11' is fed into the signal selector 402 as the interpolation data.

In this practicable example, the first and last lacking parts of each line and the first and last line lacking parts cannot be subjected to the data interpolation described above. However, they may be subjected to the data interpolation by the method explained in the embodiment of FIG. 4 or FIG. 9. Alternatively, the first and last lines and the first and last parts of each line may be rendered white on printing paper as explained before.

Figure 12:
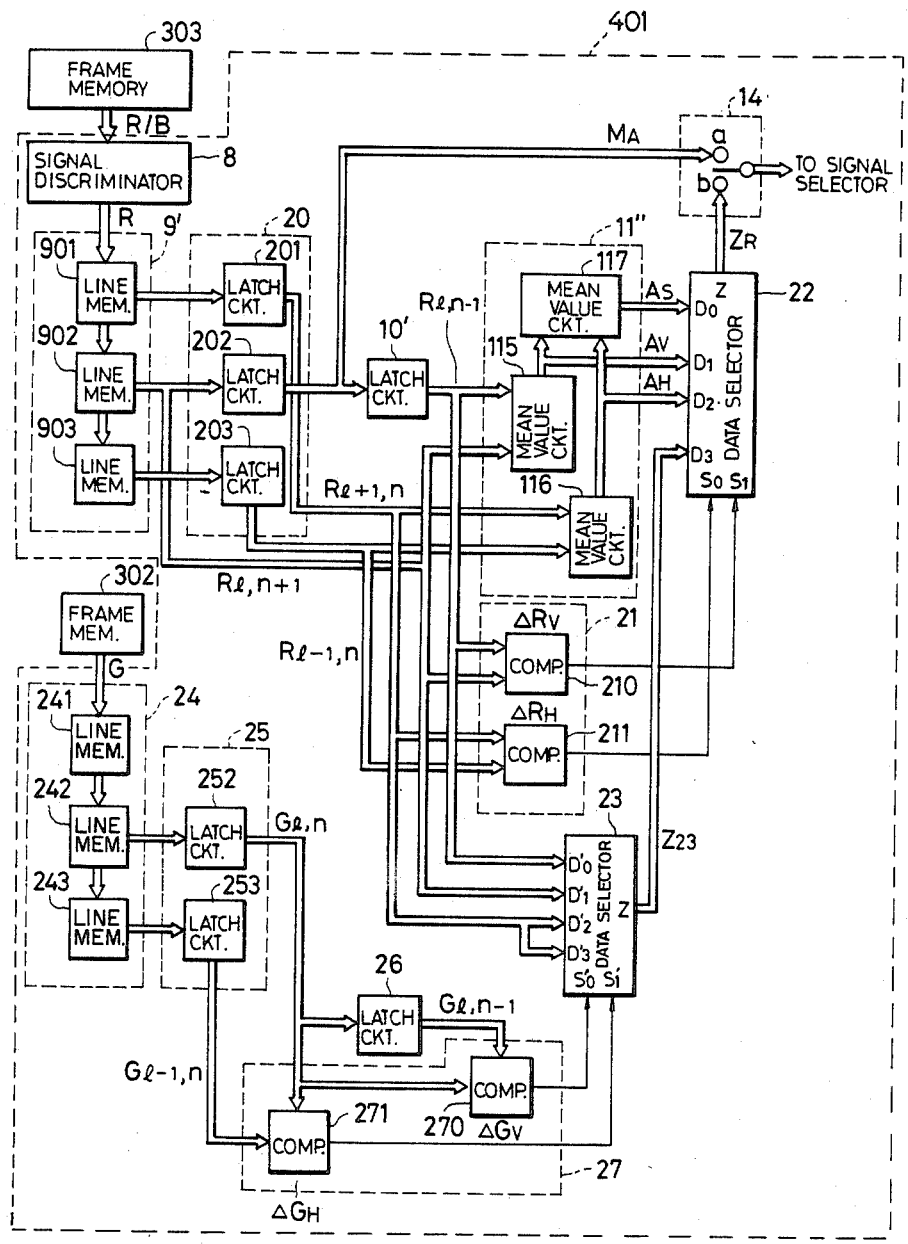

FIG. 12 shows still another practicable example of the digital interpolation circuit 401 in FIG. 1a or 1b. Added anew are a mean value circuit portion 11" including mean value circuits 115, 116 and 117; a level comparison portion 21 including comparator circuits 210 and 211; data selectors 22 and 23; a shift register portion 24 including line memories 241, 242 and 243; a latch portion 25 including latch circuits 252 and 253; a latch circuit 26; and a level comparison portion 27 including comparator circuits 270 and 271. The other portions corresponding to those in FIG. 1a or 1b and FIG. 11 are assigned the same symbols.

This practicable example usually performs the data interpolation of lacking parts in a manner similar to the practicable example shown in FIG. 11 and further performs the data interpolation of lacking parts as regards the contour parts of picture elements and so as not to deteriorate them. The contour parts of picture elements and detected with the digital G signal the information content of which is not decreased.

In the example of FIG. 12, the line memory portion 9', the latch portion 20 and the latch circuit 10' operate similarly to those in FIG. 11. The level comparison portion 11" consists of the mean value circuit 115 which creates the mean data between data read out from the line memory 902 and the output data of the latch circuit 10', the mean value circuit 116 which creates the mean value data between the output data items of the latch circuits 201 and 203, and the mean value circuit 117 which creates the mean value data between the outputs of the mean value circuits 115 and 116. The outputs $A_V$, $A_H$ and $A_S$ of these mean value circuits 115, 116 and 117 are supplied to the data selector 22 as inputs $D_1$, $D_2$ and $D_0$ respectively. Here, the output $A_S$ of the mean value circuit 117 is the same as the output $M_B$ of the mean value circuit 11' in FIG. 11.

In addition, the output data of the latch circuit 10' is supplied to the data selector 23 as an input $D_0'$, and the read-out data of the line memory 902 as an input $D_1'$, and the output data of the latch circuit 201 is supplied thereto as inputs $D_2'$ and $D_3'$. The inputs are selected according to the outputs of the level comparison portion 27, and the selected data is supplied to the data selector 22 as an input $D_3$.

Further, in the level comparison portion 21, the output data of the latch circuit 10' and the read-out data of the line memory 902 are compared by the comparator circuit 210, and the output data items of the latch circuits 201 and 203 are compared by the comparator circuit 211. On the basis of the results of the comparisons, the data selector 22 selects any of the inputs $D_0$–$D_3$.

Next, the operation of this practicable example will be described with reference to FIG. 13.

It is now assumed that the signal discriminator 8 extract the digital R signal from the R/B signal delivered from the frame memory 303, and that the lines $L_{2l+1}$, $L_{2l}$ and $L_{2l-1}$ thereof be respectively stored in the line memories 901, 902 and 903. Letting the picture element data of these lines be $R_{i,j}$ (where i denotes line No., and j denotes dot No.), as shown in FIG. 13, at the (n−1)-th addresses, the line memories 901 and 903 store the lacking part data ⊗ and the line memory 902 stores picture element data $R_{l,\,n-1}$. When note is taken of the n-th addresses, the line memories 901 and 903 store picture element data $R_{l+1,\,n}$ and $R_{l-1,\,n}$, and the line memory 902 stores lacking part data ⊗ (which is especially expressed as $$\boxed{X_{l,n}}\,).$$

When the (n+1)-th addresses are considered, the line memories 901 and 903 store the lacking part data ⊗, and the line memory 902 stores picture element data $R_{l,\,n-1}$.

First, when the output $M_A$ of the latch circuit 202 is the picture element data (assumed to be $R_{l,\,n-1}$), the switch 14 is thrown to the a side, and this picture element data item $R_{l,\,n-1}$ is fed into the signal selector 402 through the switch 14. This is the same as in the embodiment shown in FIG. 11. At this time, the line memories 901, 902 and 903 have the next n-th addresses appointed, so that the picture element data items $R_{l+1,\,n}$ and $R_{l-1,\,n}$ are respectively read out from the line memories 901 and 903 and that the lacking part data $$|X_{l,n}|$$

is read out from the line memory 902.

When the signal selector 402 has been fed with the picture data $R_{l,\,n-1}$, the latch circuits 201–203 and 10' latch their input data respectively, and the switch 14 is changed-over to the b side. Accordingly, the output of the line memory 902 becomes $R_{l,\,n+1}$, and the outputs of the latch circuits 201, 203 and 10' become $R_{l+1,\,n}$, $R_{l-1,\,n}$ and $R_{l,\,n-1}$ respectively. Simultaneously therewith, the line memories 901, 902 and 903 have the next (n+1)-th addresses appointed, so that the lacking part data items ⊗ are read out from the line memories 901 and 903 and that the picture element data $R_{l,\,n+1}$ is read out from the line memory 902. Thus, the output data items $A_V$, $A_H$ and $A_S$ of the mean value circuits 115, 116 and 117 become as follows respectively:

$$A_V = (R_{l,\,n-1} + R_{l,\,n+1})/2$$

$$A_H = (R_{l+1,\,n} + R_{l-1,\,n})/2$$

$$A_S = (A_V + A_H)/2$$

$$= (R_{l,\,n-1} + R_{l,\,n+1} + R_{l+1,\,n} + R_{l-1,\,n})/4$$

These are respectively supplied to the data selector 22 as the inputs $D_1$, $D_2$ and $D_0$. Besides, the output $Z_{23}$ of the data selector 23 is supplied to the data selector 22 as the input $D_3$.

The data selector 22 selects the inputs $D_0$–$D_3$ as an output $Z_R$ in accordance with select signals $S_0$ and $S_1$ as indicated in the following table 1, and the output $Z_R$ is fed into the signal selector 402 through the switch 14 as the interpolation data of the lacking part $$\boxed{X_{l,n}}\,.$$

TABLE 1

| $S_0$ | $S_1$ | Output $Z_R$ |
|---|---|---|
| 0 | 0 | $D_0$ |
| 1 | 0 | $D_1$ |
| 0 | 1 | $D_2$ |
| 1 | 1 | $D_3$ |

The select signals $S_0$ and $S_1$ of the data selector 22 are formed by the level comparison portion 21.

More specifically, the comparator circuit 210 compares the output data $R_{l,\,n-1}$ of the latch circuit 10' and the read-out data $R_{l,\,n+1}$ of the line memory 902 and obtains the difference data $\Delta R_V$:

$$\Delta R_V = |R_{l,\,n-1} - R_{l,\,n+1}|$$

which is compared with preset reference data $D_S$. The reference data $D_S$ is set at about ½ of the maximum value of $\Delta R_V$. Likewise, the comparator circuit 211 obtains the difference data $\Delta R_H$ between the output data items of the latch circuits 201 and 203, namely:

$$\Delta R_H = |R_{l+1,\,n} - R_{l-1,\,n}|$$

which is compared with the reference data $D_S$. According to the results of the comparisons, the select signals $S_0$ and $S_1$ are determined as listed in the following table:

TABLE 2

| Mode | $S_0$ | $S_1$ | Detection of Level Differences | Output $Z_R$ |
|---|---|---|---|---|
| A | 0 | 0 | $\Delta R_H < D_S$<br>$\Delta R_V < D_S$ | $D_0 = A_S$ |
| B | 1 | 0 | $\Delta R_H \geq D_S$<br>$\Delta R_V < D_S$ | $D_1 = A_V$ |
| C | 0 | 1 | $\Delta R_H < D_S$<br>$\Delta R_V \geq D_S$ | $D_2 = A_H$ |
| D | 1 | 1 | $\Delta R_H \geq D_S$<br>$\Delta R_V \geq D_S$ | $D_3 = Z_{23}$ |

As understood from Table 2, when the difference data items $\Delta R_H$ and $\Delta R_V$ in the mode A are smaller than the reference data $D_S$, the level differences of the picture element data items around the lacking part $X_{l,\,n}$ are small, and accordingly, the red color hardly changes near this lacking part $X_{l,\,n}$. In this case, the interpolation data $D_0$ similar to that of the embodiment in FIG. 11 is used. In the case of the mode B, it is expressed that the change between the picture element data items $R_{l+1,\,n}$ and $R_{l-1,\,n}$ of the two lines adjoining the lacking part $X_{l,\,n}$ is great and that the change between the picture element data items $R_{l,\,n-1}$ and $R_{l,\,n+1}$ holding the lacking part $X_{l,\,n}$ therebetween along the line $L_l$ is small. Accordingly, picture element data for this lacking part $X_{l,\,n}$ ought to be nearly equal to the two picture element data items $R_{l,\,n-1}$ and $R_{l,\,n+1}$ along the line $L_l$. Therefore, the data selector 22 selects the output data $A_V$ (=input $D_1$) of the mean value circuit 115, which is used as the interpolation data. This data item forms a vertical contour along the line $L_l$ as to red. In the case of the mode C, the change between the picture element data items $R_{l, n-1}$ and $R_{l, n+1}$ of the same line $L_l$ holding the lacking part $X_{l, n}$ therebetween is great, and the change between the picture element data items $R_{l-1, n}$ and $R_{l+1, n}$ of the respective lines $L_{l-1}$ and $L_{l+1}$ is small. This signifies a horizontal contour concerning red, which is orthogonal to the line and passes through the picture element $R_{l, n}$. In this case, the data selector 22 selects the mean value of the picture element data items $R_{l-1, n}$ and $R_{l+1, n}$ of small change, namely, the output data $A_H$ (=$D_2$) of the mean value circuit 116, and this data item is used as the interpolation data.

In the case of the mode D, great changes are involved between the picture element data items $R_{l, n-1}$ and $R_{l, n+1}$ of the same line $L_l$ holding the lacking part $X_{l, n}$ therebetween and between the picture element data items $R_{l+1, n}$ and $R_{l-1, n}$ of the respective lines $L_{l+1}$ and $L_{l-1}$ holding the lacking part $X_{l, n}$ therebetween. This corresponds to a case where a contour concerning red exist in a direction oblique to the line. In this case, the data selector 22 selects the output data $Z_{23}$ (=$D_3$) of the data selector 23 and supplies it to the signal selector 402 as the interpolation data. The output data $Z_{23}$ of the data selector 23 will be explained below.

The reason why, in the preceding B and C modes, the mean value of the picture data items $R_{l+1, n}$ and $R_{l-1, n}$ and the mean value of the picture data items $R_{l, n-1}$ and $R_{l, n+1}$ of great change are not used as the interpolation data items, is that the digital R signal is of narrow band and has a small amount of information, so these mean values cannot always approximate the data items which ought to exist in the lacking parts $X_{l, n}$, namely, the picture element data items which have been missed by the synthesis switch 301 in FIG. 1a or 305 in FIG. 1b. It is accordingly impossible also in the D mode that the mean value of the picture element data items $R_{l, n-1}$, $R_{l+1, n}$, $R_{l, n+1}$ and $R_{l-1, n}$ surrounding the lacking part $X_{l, n}$ be used as the interpolation data of this lacking part $X_{l, n}$.

On the other hand, the digital G signal is a wideband signal and does not lack any picture element data, so that it has a very large amount of information. Meanwhile, assuming that a contour exist obliquely on a frame thereby to give rise to the oblique contour concerning red as explained before, a similar oblique contour will exist concerning also the green color. Herein, when as to the digital R signal, the output data $A_V$, $A_H$ or $A_S$ of the mean value circuit 115, 116 or 117 is used as the interpolation data of the lacking part $X_{l, n}$ in this contour, the digital R signal changes gently in this contour part as indicated by a broken line in FIG. 14. This fact holds true for the digital B signal. In contrast, let it be assumed that, as illustrated in the figure, the digital G signal changes abruptly in this contour part, between the picture element data $G_{l, n-1}$ of the digital G signal corresponding to the picture element in which the digital R signal has the picture element data $R_{l, n-1}$ (hereinbelow, the same suffixes shall be assigned to the picture element data items of the respective digital color signals of an identical picture element) and the picture element data $G_{l, n}$. Then, in the case where the aforementioned mean values are used as the interpolation data items for the lacking parts $X_{l, n}$ of the digital R and G signals as described above, the value of the picture data $G_{l, n}$ of the digital G signal is greater as compared with the values of the interpolation data items, and hence, the contour in the oblique direction becomes greenish on the printed frame.

As the contour, it is more preferable to be fringed in black rather than to be colored in green in this manner. To this end, in the case where the digital G signal changes as shown in FIG. 14, also the digital R signal should better be changed as indicated by a solid line, not by a dotted line. In this case, the picture element data $R_{l, n+1}$ is employed as the interpolation data of the lacking part $X_{l, n}$ of the digital R signal.

In this way, in the case of the mode D in Table 2 mentioned above, the interpolation data items of the lacking parts of the digital R and G signals are determined according to the change of the digital G signal. As this interpolation data item, the data selector 23 selects one of the picture element data $R_{l, n-1}$ from the latch circuit 10', the picture element data $R_{l, n+1}$ from the line memory 902 and the picture element data $R_{l+1, n}$ from the latch circuit 201 through select signals $S_0'$ and $S_1'$ in accordance with the change of the digital G signal.

There will now be explained the detection of the change of the digital G signal and the selecting operation of the data selector 23 responsive to this change.

The digital G signal read out from the frame memory 302 is supplied to the shift register portion 24, and one picture element data item is stored in each of the shift registers 241, 242 and 243. Here, the shift registers 241, 242 and 243 store the picture element data items of the digital G signal at the same picture element positions as those of data items which are being read out from the line memories 901, 902 and 903. Assuming that the read-out data from the line memory 902 be the picture element data $R_{l, n+1}$, the picture element data $G_{l, n+1}$ is being stored in the shift register 242. On this occasion, the latch circuit 252 latches the picture element data $G_{l, n}$ on the same line $L_l$ as that of the picture element data $G_{l, n+1}$ and preceding by one dot, and the latch circuit 26 latches the picture element data $G_{l, n-1}$ preceding by one more dot. In addition, the shift register 243 stores the picture element data $G_{l-1, n+1}$ of the line $L_{l-1}$, and the latch circuit 253 latches the picture element data $G_{l-1, n}$ preceding by one dot. The positional relations of these picture element data items and the storing circuits are shown in FIG. 15 in correspondence with FIG. 13. The storing circuits are indicated by suffixes.

The level comparison portion 27 subjects the output data items of the latch circuits 252, 253 and 26 to comparison processes similar to those of the level comparison portion 21.

More specifically, the comparator circuit 270 compares the output data items $G_{l, n}$ and $G_{l, n-1}$ of the respective latch circuits 252 and 26 and obtains difference data $\Delta G_V$:

$$\Delta G_V = |G_{l, n} - G_{l, n-1}|$$

so as to decide the relation of magnitudes with the reference data $D_S$. The result of this decision is the $S_0'$ input of the data selector 23. Besides, the comparator circuit 271 compares the output data items $G_{l, n}$ and $G_{l-1, n}$ of the respective latch circuits 252 and 253 and obtains difference data $\Delta G_H$:

$$\Delta G_H = |G_{l-1, n} - G_{l, n}|$$

so as to decide the relation of magnitudes with the reference data $D_S$. The result of this decision is the $S_1'$ input of the data selector 23. According to such $S_0'$ and $S_1'$ inputs, the data selector 23 selects any one of its inputs $D_0'$–$D_3'$ as indicated in Table 3 below.

TABLE 3

| Mode | $S_0$ | $S_1$ | Detection of Level Differences | Output $Z_{23}$ of Data Selector 23 |
|---|---|---|---|---|
| E | 0 | 0 | $\Delta G_V < D_S$<br>$\Delta G_H < D_S$ | $D_0' = R_{l,n-1}$ |
| F | 1 | 0 | $\Delta G_V \geq D_S$<br>$\Delta G_H < D_S$ | $D_1' = R_{l,n+1}$ |
| G | 0 | 1 | $\Delta G_V < D_S$<br>$\Delta G_H \geq D_S$ | $D_2' = R_{l+1,n}$ |
| H | 1 | 1 | $\Delta G_V \geq D_S$<br>$\Delta G_H \geq D_S$ | $D_3' = R_{l+1,n}$ |

As seen from FIG. 15, $\Delta G_V$ denotes the change of picture element data items in the vertical direction (along the line), and $\Delta G_H$ the change of picture element data items in the horizontal direction.

In Table 3, in the case of the mode E, the horizontal and vertical changes of the picture element data items of the digital G signal are small in relation to the lacking part $X_{l,n}$ of the digital R signal. In this case, the digital G signal changes little and no contour exists as to this signal. The data selector 23 selects the input $D_0'$, namely, the picture element data $R_{l,n-1}$ delivered by the latch circuit 10' and supplies it to the $D_3$ input end of the data selector 22. When both the inputs $S_0$ and $S_1$ of the data selector 22 are "1", that is, when the digital R signal has the oblique contour, the data selector 22 uses as the interpolation data of the lacking part $X_{l,n}$ the picture element data $R_{l,n-1}$ on the same line $L_l$ and directly preceding the lacking part $X_{l,n}$ and delivers it as an output $Z_R$. This corresponds to pre-holding in which the picture element data $R_{l,n-1}$ is held and is supplemented to the lacking part $X_{l,n}$.

The picture element data $R_{l,n-1}$ may well be replaced with picture element data $R_{l-1,n}$ as the interpolation data. This measure signifies preholding in the direction orthogonal to the line (namely, in the horizontal direction).

When the lacking part of the digital R signal is subjected to the data interpolation in this manner, the color change on the printed frame becomes abrupt to clarify the contour of the color.

In the mode F, the change of picture element data in the line direction (vertical direction) as to the digital G signal is great. In this case, the data selector 23 selects the picture element data $R_{l,n+1}$ ($D_1'$ input) along the line $L_l$ of the lacking part $X_{l,n}$ of the digital R signal and directly succeeding the lacking part and delivers it to the data selector 22. When both the inputs $S_0$ and $S_1$ are "1", the data selector 22 delivers the picture element data $R_{l,n+1}$ supplied from said data selector 23, as interpolation data for the lacking part $X_{n,l}$. Thus, the contour concerning the digital R signal and the contour concerning the digital G signal are registered on the printed image, and they are made abrupt to equal extents so as to clarify the contours of the colors on the printed image. That is, the contours are not colored in green by way of example but become rather blackish.

In the mode G, picture element data items change greatly in the direction of adjacent lines (in the horizontal direction) as to the digital G signal. In this case, the data selector 23 selects the picture element data $R_{l+1,n}$ of the line $L_{l+1}$ directly succeeding the line $L_l$ where the lacking part $X_{l,n}$ exists, and it supplies the selected data to the data selector 22. When both the inputs $S_0$ and $S_1$ are "1", the data selector 22 delivers the picture element data $R_{l+1,n}$ supplied from the data selector 23, as interpolation data for the lacking part $X_{l,n}$. Thus, the same effects as in the mode F are attained.

The mode H is a case where the oblique contour exists concerning the digital G signal. In this case, as in the case of the mode G, the picture element data $R_{l+1,n}$ (the $D_3'$ input of the data selector 23) as the interpolation data of the lacking part $X_{l,n}$ of the digital R signal. This is intended to attain the same effects as in the mode F, and the picture element data $R_{l+1,n}$ may well be replaced with the picture element data $R_{l,n+1}$ directly succeeding the lacking part $X_{l,n}$ of the line $L_l$.

As described above, in the case where the lacking part $X_{l,n}$ of the digital R signal registers with the oblique contour, the interpolation data of this lacking part $X_{l,n}$ is set according to the change of the digital G signal which has the large amount of information with no data omitted, whereby the contour in the printed image becomes clear without being colored. Besides, contours in the horizontal and vertical directions concerning the digital R signal can be clearly reproduced. Needless to say, the data interpolation processing stated above is similarly executed for the digital B signal.

Although, in this practicable example, the processes of holding and operating various data items and the function of selecting data have been realized with hardware, they may well be realized with software by the use of a microcomputer or the like.

In the level comparison portions 21 and 27, the items of reference data $D_S$ have been equalized and have been set at ½ of the dynamic range. Needless to say, however, the reference data $D_S$ can be set at will, in accordance with a printing function or for each of the level comparison portions 21 and 27 or the comparator circuits 210, 211, 270 and 271, Further, it is a matter of course that, as in the preceding practicable examples, the first and last lacking parts of each line may be supplemented or that the first and last dots of each line and the first and last lines may be similarly made white on the printing paper.

Although, in the embodiments, the R and B signals are multiplexed and stored in the identical frame memory, they may well be stored in individual memories, and if necessary, the sampling rate may well be lowered for only the B signal by way of example so as to reduce the capacity of the memory.

What is claimed is:

1. A signal processing circuit for a color video printer wherein images of first, second and third colors are successively printed to reproduce a color print on a surface for printing, comprising:

a signal input portion which includes first, second and third color signal input means that are respectively supplied with first, second and third color signals corresponding to the images of the first, second and third colors;

memory means which includes a first memory for storing samples of the first color signal, and a second memory for storing samples of both the second and third color signals;

switch means connected to said second and third color signal input means and said second memory for supplying to said second memory samples of said second and third color signals alternately;

data interpolation means connected to said second memory for generating a first interpolation data signal based on samples of the second color signal and a second interpolation data signal based on samples of the third color signal stored in said second memory and for delivering an interpolated color signal including the second or third color signal stored in said second memory and said first or second interpolation data signal, respectively, wherein said data interpolation means includes means for delivering, as the interpolation data signal, data which is previously determined when the interpolation value is to be in the first line or the last line of an image;

selector means connected to said first memory and said data interpolation means for delivering samples of the first color signal read out from said first memory and the interpolated signal including one of the first and second interpolation data signals received from said data interpolation means as print signals in a printing order; and print means connected to said selector means for printing images on a surface-for-printing successively in accordance with the print signals supplied from said selector means.

2. A signal processing circuit for a color video printer as defined in claim 1, wherein said dta interpolation means comprises detection means to detect a signal level of samples of the second color signal, and contour data generation means to insert interpolation data between samples in said second color signal in accordance with the output of said detection means.

3. A signal processing circuit for a color video printer as defined in claim 1, wherein the previously determined data is data which reproduces a white image.

4. A signal processing circuit for a color video printer as defined in claim 1, wherein said data interpolation means comprises a first line memory which holds data $D_{2L-1}$ of a (2L−1)-th line, a second line memory which holds data $D_{2L}$ of a 2L-th line, a third line memory which holds data $D_{2L+1}$ of a (2L+1)-th line, and interpolation data generation means to create interpolation data $D_{2L, 2N-1}$ of an n-th address for the data $D_{2L}$ of the 2L-th line, on the basis of the data items $D_{2L-1}$, $D_{2L}$ and $D_{2L+1}$ held in said first, second and third line memories respectively, as follows:

$$D_{2L,2n-1}=(D_{2L-1,2n-1}+D_{2L+1,2n-1}+D_{2L,2n-2}+D_{2L,2n})/4$$

5. A signal processing circuit for a color video printer wherein images of a plurality of colors are successively printed on a surface for printing so as to reproduce a color print, comprising:

a color signal input portion which includes a plurality of color signal input means that are respectively supplied with a plurality of analog color signal corresponding to a plurality of colors;

first analog-to-digital conversion means for converting a first one of the plurality of analog color signals into a first digital color signal at a first sampling rate;

second analog-to-digital conversion means for converting a second one of the plurality of analog color signals into a second digital color signal at a second sampling rate;

first memory means which is connected to said first analog-to-digital conversion means and which stores the first digital color signal;

second memory means which is connected to said second analog-to-digital conversion means and which stores the second digital color signal;

data interpolation means connected to said second memory means for generating an interpolation data signal based on the second digital color signal stored in said second memory means and for delivering an interpolated digital color signal including the second digital color signal from said second memory means and the interpolation data signal, wherein said data interpolation means includes means for delivering, as the interpolation data signal, data which is previously determined when the interpolation value is to be in the first line or the last line of an image;

selector means connected to said first memory means and said data interpolation means for delivering the first digital color signal read out from said first memory means and the interpolated digital color signal delivered from said data interpolation means, as print signals in a printing order; and print means connected to said selector means for printing the images of the plurality of colors on the surface-for-printing in accordance with the print signals supplied from said selector means.

6. A signal processing circuit for a color video printer as defined in claim 5, wherein the second sampling rate is not higher than $\frac{1}{2}$ of the first sampling rate.

7. A signal processing circuit for a color video printer as defined in claim 6, wherein said data interpolation means comprises detection means to detect a signal level of samples of the first digital color signal, and contour data generation means to insert interpolation data between samples in said second color signal in accordance with the output of said detection means.

8. A signal processing circuit for a color video signal as defined in claim 5, wherein the previously determined data is data which reproduces a white image.

9. A signal processing circuit for a color video signal as defined in claim 6, wherein said data interpolation means comprises a first line memory which holds data $D_{2L-1}$ of a (2L−1)-th line, a second line memory which holds data $D_{2L}$ of a 2L−th line, a third line memory which holds data $D_{2L+1}$ of a (2L+1)-th line, and interpolation data generation means to create interpolation data $D_{2L, 2n-1}$ of an n-th address for the data $D_{2L}$ of the 2L-th line, on the bais of the data items $D_{2L-1}$, $D_{2L}$ and $D_{2L+1}$ held in said first, second and third line memories respectively, as follows:

$$D_{2L,2n-1}=(D_{2L-1,2n-1}+D_{2L+1,2n-1}+D_{2L,2n-2}+D_{2L,2n})/4.$$

10. A signal processing circuit for a color video printer having plural memories which store a plurality of color signals, respectively, and print means for reading out the color signals from the memories in succession so as to print images on a printing paper in accordance with the color signals read out, comprising:

memory control means for sampling at least one of the plurality of color signals so as to store it in a memory; and data interpolation means, connected to said memory and to said print means, for generating interpolation data signals between sample points of the color signal samples stored in said memory by interpolation of adjacent samples, wherein said data interpolation means includes means for delivering, as the interpolation data signals, data which is previously determined when the interpolation value is to be in the first line or in the last line of an image.

11. A signal processing circuit for a color video printer as defined in claim 10, wherein said memory control means comprises an analog color signal input and analog-to-digital conversion means connected to said analog color signal input and its output connected to said memory for converting an analog color signal applied to said analog signal input, into a digital color signal and for delivering the latter to said memory.

12. A signal processing circuit for a color video printer as defined in claim 11, wherein said analog-to-digital conversion means comprises a plurality of analog-to-digital converters which convert a plurality of analog color signals into digital color signals respectively.

13. A signal processing circuit for a color video printer as defind in claim 12, wherein said analog-to-digital conversion means comprises switch means connected to the output of at least two of said plurality of analog-to-digital converters for selecting one of the plurality of digital color signals applied thereto.

14. A signal processing circuit for a color video printer as defined in claim 12, wherein said analog-to-digital conversion means comprises switch means connected to receive at least two analog signals and having an output connected to one of said plurality of analog-to-digital converters for selecting one of a plurality of analog colors signals applied thereto.

15. A signal processing circuit for a color video printer as defined in claim 10, wherein said data interpolation means comprises detection means to detect signal levels of samples of said color signal stored in said memory, and contour data generation means to insert an interpolation data signal between samples of the color signal received from said memory in accordance with the outputs of said detection means.

16. A signal processing circuit for a color video signal as defined in claim 10, wherein said data interpolation means comprises a first line memory which holds dta $D_{2L-1}$ of a $(2L-1)$-th line, a second line memory which holds data $D_{2L}$ of a 2L-th line, a third line memory which holds data $D_{2L+1}$ of $(2L+1)$-th line, and interpolation data generation means to create interpolation data $D_{2L,2n-1}$ of an n-th address for the data $D_{2L}$ of the 2L-th line, on the bais of the data items $D_{2L-1}$, $D_{2L}$ and $D_{2L+1}$ held in said first, second and third line memories respectively, as follows:

$$D_{2L,2n-1} = (D_{2L-1,2n-1} + D_{2L+1,2n-1} + D_{2L,2n-2} + D_{2L,2n})/4.$$

17. A signal processing circuit for a color video signal as defined in claim 10, wherein the previously determined data is data which reproduces a white image.

18. A signal processing circuit for a color video printer wherein images of first, second and third colors are successively printed to reproduce a color print on a surface for printing, comprising:
a signal input portion which includes first, second and third color signal input means that are respectively supplied with first, second and third color signals corresponding to images of the first, second and third colors;
memory means which includes a first memory for storing samples of the first color signal, and a second memory for storing samples of both the second and third color signals;
switch means, connected to said second and third color signal input means and said second memory, for supplying to said second memory sample of said second and third color signals alternately;
data interpolation means connected to said second memory for generating an interpolation data signal based on samples of the second color signal and the third color signal stored in said second memory and supplied in a printing order to deliver the interpolation data signal, including edge detecting means for detecting an edge of the signal provided from the second memory on the basis of position data indicating a side of the point to be interpolated; level detecting means to detect the signal level of said first signal positioned corresponding to the interpolation point of the signal provided from the second memory in the case of detecting the edge using said edge detecting means, and contour data generation means for generating the interpolation data at the high luminance signal level selected from the signal data from the second memory and which is also positioned next to the point to be interpolated in the case where the output level of the level-detecting means is larger than a predetermined level, and for generating the interpolation data at the low luminance signal level selected from the signal data provided from the second memory and which is also positioned next to the point to be interpolated in the case where the output level of the level detecting means is not larger than a predetermined level;
selector means connected to said first memory and said data interpolation means for delivering the first color signal read out from said first memory and the interpolation data signal delivered from said data interpolation means, as print signals in a printing order; and
print means connected to said selector means, for printing images on the surface-for-printing successively in accordance with the print signals supplied from said selector means.

19. A signal processing circuit for a color video printer wherein images of a plurality of colors are successively printed on a surface for printing so as to reproduce a color print, comprising:
a color signal input portion which includes a plurality of color signal input means that are respectively supplied with a plurality of analog color signals corresponding to said plurality of colors;
first analog-to-digital conversion means for converting a first one of the plurality of analog color signals into a first digital color signal at a first sampling rate;
second analog-to-digital conversion means for converting a second one of the plurality of analog color signals into a second digital color signal at a second sampling rate;
first memory means connected to said first analog-to-digital conversion means for storing the first digital color signal;
second memory means connected to said second analog-to-digital conversion means for storing the second digital color signal;

data interpolation means connected to said second memory, for generating an interpolation data signal of the second digital color signal stored in said second memory and supplied in a printing order to deliver the interpolation data signal, including edge detecting means for detecting an edge of the signal provided from the second memory on the basis of position data indicating a side of the point to be interpolated; level detecting means to detect the signal level of said first signal positioned corresponding to the interpolation point of the signal provided from the second memory in the case of detecting the edge using said edge detecting means, and contour data generation means for generating the interpolation data at the high luminance signal level selected from the signal data from the second memory and which is also positioned next to the point to be interpolated in the case where the output level f the level-detecting means is larger than a predetermined level, and for generating the interpolation data at the low luminance signal level selected from the signal data provided from the second memory and which is also positioned next to the point to be interpolated in the case where the output level of the level detecting means is not larger than a predetermined level;

selector means connected to said first memory and said data interpolation means, for delivering the first digital color signal read out from said first memory and the third digital color signal delivered from said data interpolation means, as print signals in a printing order; and print means connected to said selector means, for printing the images of the plurality of colors on the surface-for-printing in accordance with the print signals supplied from said selector means.

* * * * *